(12) United States Patent
Zhang et al.

(10) Patent No.: US 8,845,482 B2
(45) Date of Patent: Sep. 30, 2014

(54) HYBRID POWER DRIVING SYSTEM AND DRIVING METHOD OF THE SAME

(75) Inventors: Xinxin Zhang, Guangdong (CN); Yinmei Zhou, Guangdong (CN); Song Li, Guangdong (CN); Fei Luo, Guangdong (CN)

(73) Assignees: Shenzhen BYD Auto R&D Company Limited, Shenzhen, Guangdong (CN); BYD Company Limited, Shenzhen, Guangdong (CN)

( * ) Notice: Subject to any disclaimer, the term of this patent is extended or adjusted under 35 U.S.C. 154(b) by 61 days.

(21) Appl. No.: 13/540,195

(22) Filed: Jul. 2, 2012

(65) Prior Publication Data
US 2012/0323426 A1 Dec. 20, 2012

Related U.S. Application Data

(63) Continuation of application No. PCT/CN2010/080135, filed on Dec. 22, 2010.

(30) Foreign Application Priority Data

Dec. 31, 2009 (CN) .......................... 2009 1 0238834

(51) Int. Cl.
*B60K 6/442* (2007.10)
*B60W 10/02* (2006.01)
*B60W 10/06* (2006.01)
*B60W 10/08* (2006.01)
*B60W 20/00* (2006.01)
*F02N 11/00* (2006.01)

(52) U.S. Cl.
USPC .................. 477/5; 477/12; 477/14; 477/175; 475/5; 180/65.225; 180/65.265

(58) Field of Classification Search
None
See application file for complete search history.

(56) References Cited

U.S. PATENT DOCUMENTS

| 6,007,451 | A | * | 12/1999 | Matsui et al. .................... 477/19 |
| 6,190,282 | B1 | * | 2/2001 | Deguchi et al. .................... 477/5 |
| 6,569,055 | B2 | * | 5/2003 | Urasawa et al. .................... 477/5 |
| 7,306,064 | B2 | * | 12/2007 | Imazu et al. ............. 180/65.285 |
| 7,938,209 | B2 | * | 5/2011 | Dilzer et al. ................ 180/65.28 |
| 8,060,266 | B2 | * | 11/2011 | Hidaka et al. .............. 180/65.31 |
| 8,336,653 | B2 | * | 12/2012 | Ren et al. ...................... 180/65.6 |
| 2008/0300100 | A1 | * | 12/2008 | Matsubara et al. ................ 477/5 |
| 2008/0305924 | A1 | * | 12/2008 | Soliman et al. .................... 477/5 |
| 2009/0062061 | A1 | * | 3/2009 | Silveri et al. ...................... 477/5 |
| 2010/0125021 | A1 | * | 5/2010 | Matsubara et al. ................ 477/5 |
| 2011/0301792 | A1 | * | 12/2011 | Yamazaki et al. ......... 180/65.23 |
| 2012/0022731 | A1 | * | 1/2012 | Kuang et al. .............. 180/65.21 |

* cited by examiner

*Primary Examiner* — Jacob S Scott
(74) *Attorney, Agent, or Firm* — Finnegan, Henderson, Farabow, Garrett & Dunner, LLP

(57) ABSTRACT

A hybrid power driving system is provided, comprising an engine; a first motor; a first reducing mechanism, a second clutch, a first wheels group, a second motor, a second wheels group, a second reducing mechanism, an energy storage device, a clutch, an engine controller, and a motor controller. The motor controller may be configured to: start or stop at least one of the first motor or the second motor; and control the clutch controller and the engine controller according to a running mode of the hybrid power driving system. A driving method for the driving system as described hereinabove is also provided.

20 Claims, 9 Drawing Sheets

US 8,845,482 B2

HYBRID POWER DRIVING SYSTEM AND DRIVING METHOD OF THE SAME

CROSS-REFERENCE TO RELATED APPLICATIONS

The present application is a continuation of International Application No. PCT/CN2010/080135, filed Dec. 22, 2010, which claims the benefit of priority to Chinese Patent Application No. 200910238834.5, filed with China Patent Office on Dec. 31, 2009, both of which are incorporated by reference herein in their entirety.

FIELD

The present disclosure relates to hybrid power vehicles, more particularly to a hybrid power driving system and a driving method of the same.

BACKGROUND

Hybrid power vehicles have the power advantages of both pure-electric vehicles and conventional gasoline vehicles, and can provide excellent energy savings while helping to protect the environment. The clutch system is an important part in the hybrid power vehicle. The clutch system directly relates to the efficiency and stability of power transmission in the vehicle, especially in hybrid powered 4-wheel driving vehicles. A hybrid powered 4-wheel driving system provides more power to a vehicle than a hybrid power dual wheel driving system, and can therefore meet the requirements of high power vehicles. However, one disadvantage of the hybrid powered 4-wheel driving system lies in its clutch control. In particular, if the hybrid powered 4-wheel driving system has more than one clutch, the system may not realize accurate control of the clutch, and as a result, the power transmission of the driving system may not be smooth. This can negatively impact the efficiency and ride comfort of the vehicle, and reduce the lifespan of the clutches.

SUMMARY

The present disclosure is directed to solve at least one of the problems in the prior art. Accordingly, a hybrid power driving system is provided, which overcomes the instability of power transmission in conventional hybrid power driving systems arising from inaccurate control of clutches, by controlling the clutches in a precise way, thereby enhancing the transmission efficiency and the stability of the driving system. A method for driving the hybrid power driving system is also provided, which controls the driving system in a precise and stable manner.

According to an embodiment of the invention, a hybrid power driving system is provided, comprising: an engine; a first motor; a first clutch operatively coupled between the engine and the first motor; a first reducing mechanism having a first input portion and a first output portion; a second clutch operatively coupled between the first motor and the first input portion of the first reducing mechanism; a first wheels group operatively coupled to the first output portion of the first reducing mechanism; a second motor; a second wheels group; a second reducing mechanism having a second input portion operatively coupled to the second motor, and a second output portion operatively coupled to the second wheels group; an energy storage device coupled to the first motor and the second motor; a clutch controller configured to engage or disengage the first clutch and/or the second clutch; an engine controller configured to start or stop the engine; and a motor controller connected with the clutch controller and the engine controller, configured to: start or stop the first motor and/or the second motor; and control the clutch controller and the engine controller according to a running mode of the hybrid power driving system.

According to another embodiment of the invention, a method for driving the hybrid power driving system is provided, comprising: controlling the clutch controller by the motor controller to engage or disengage the first clutch and/or the second dutch to switch between running modes of the hybrid power driving system.

Using the driving system and the driving method as described, the clutches can be accurately controlled with greater efficiency with the aid of the motor controller and the clutch controller, thus improving the stability of the power transmission in the vehicle.

BRIEF DESCRIPTION OF THE DRAWINGS

The aforementioned features and advantages of the invention as well as additional features and advantages thereof will be more clearly understood hereinafter as a result of a detailed description of embodiments when taken in conjunction with the drawings.

DETAILED DESCRIPTION OF THE EMBODIMENTS

It will be appreciated by those of ordinary skill in the art that the present disclosure can be embodied in other specific forms without departing from the spirit or essential character thereof. The presently disclosed embodiments are therefore considered in all respects to be illustrative and not restrictive.

Figure 1:
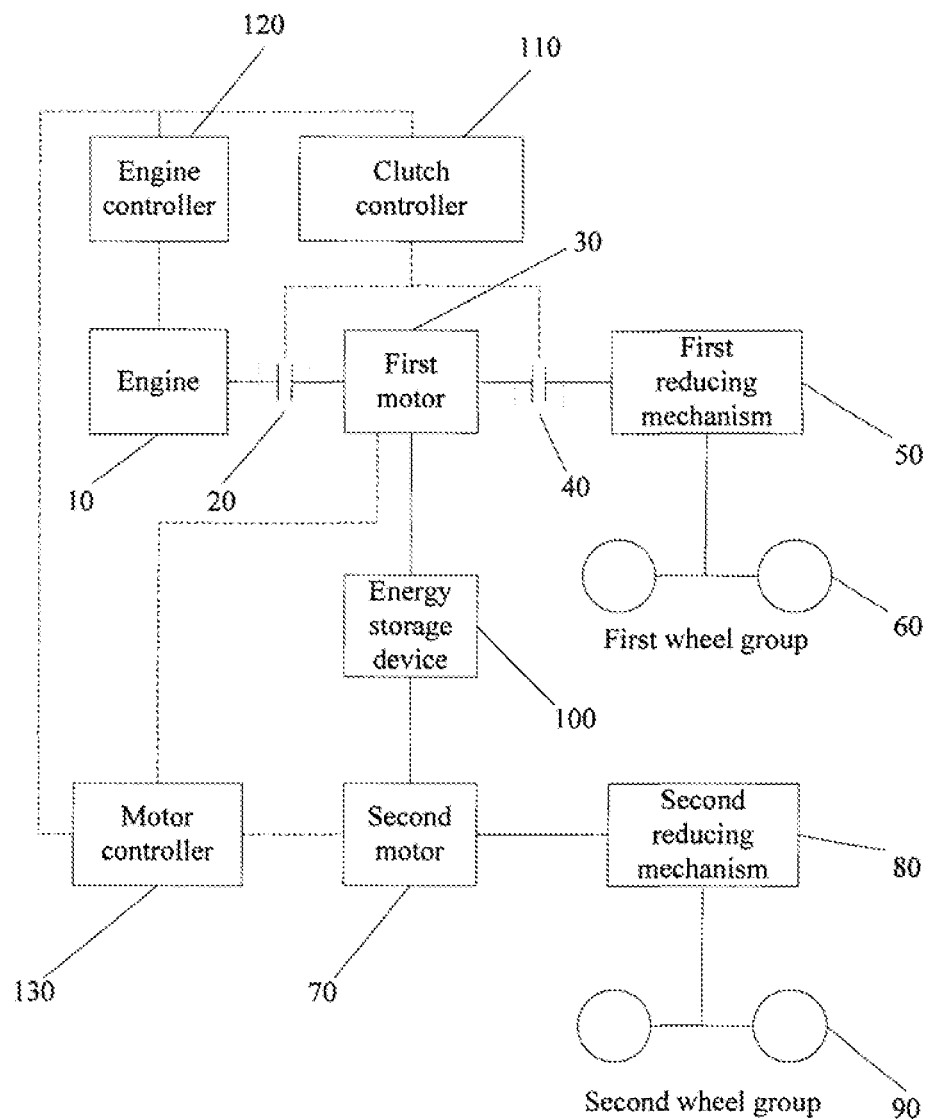
FIG. 1 is a schematic block diagram of a hybrid power driving system according to an embodiment of the present disclosure.

A hybrid power driving system will be described in detail in conjunction with accompanying figures. As shown in FIG. 1, according to an embodiment of the present disclosure, the hybrid power driving system comprises: an engine 10; a first motor 30; a first clutch 20 operatively coupled between the engine 10 and the first motor 30, a first reducing mechanism 50 having a first input portion (not shown) and a first output portion (not shown); a second clutch 40 operatively coupled between the first motor 30 and the first input portion of the first reducing mechanism 50; a first wheels group 60 operatively coupled to the first output portion of the first reducing mechanism 50; a second motor 70; a second wheels group 90; a second reducing mechanism 80 having a second input portion operatively coupled to the second motor 70, and a second output portion operatively coupled to the second wheels group 90; an energy storage device 100 connected to the first motor 30 and the second motor 70; a clutch controller 110 configured to engage or disengage the first clutch 20 and/or the second clutch 40; an engine controller 120 configured to start or stop the engine 10; and a motor controller 130 connected with the clutch controller 110 and the engine controller 120, configured to start or stop the first motor 30 and/or the second motor 70, and control the clutch controller 110 and the engine controller 120 according to a running mode of the hybrid power driving system.

According to an embodiment of the present disclosure, the engine 10 may comprise a gasoline engine, diesel engine, or any other type of fuel engine.

The first clutch 20 and the second dutch 40 may comprise clutches commonly known to one of ordinary skill in the art.

The first motor 30 and the second motor 70 may comprise AC motors, switched reluctance motors, permanent magnet motors, etc. According to the principle of electromagnetic induction, the first motor 30 and the second motor 70 can work in either a generator mode or a motor mode. When operating in the generator mode, the first and second motors transform mechanical energy into electrical energy. When operating in the motor mode, the first and second motors transform the electrical energy into the mechanical energy. For example, when power from the engine 10 is transferred to the first motor 30 via the engaged first clutch 20, the first motor 30 works in the generator mode. In this mode, the first motor 30 transforms mechanical energy into electrical energy, and the electrical energy is transferred to and stored in the energy storage device 100 accordingly. When the driving system runs in the regenerative braking mode and the braking energy fed back from the first set of wheels and/or the second set of wheels is transmitted to the first motor 30 and/or the second motor 70, the first motor 30 and/or the second motor 70 works in the generator mode. In this mode, mechanical energy is transformed into electrical power, and transmitted to and stored in the energy storage device 100. While the energy storage device 100 provides the electrical power to the first motor 30 and the second motor 70, both the first motor 30 and the second motor 70 work in the motor mode, in which the electrical energy is transformed into mechanical energy to drive the wheels.

According to an embodiment of the present disclosure, the first reducing mechanism 50 and the second reducing mechanism 80 may comprise reducing gears, transmissions, differential mechanisms, planetary gears, etc. As commonly known by those skilled in the art, the power transferred from the first reducing mechanism 50 and the second reducing mechanism 80 may be separately transferred to the first wheels group 60 and the second wheels group 90 through a shaft coupling, or a wheel driving shaft, etc. to drive the vehicle.

According to an embodiment of the present disclosure, the energy storage device 100 may comprise a rechargeable energy source, such as a storage battery pack, a fuel battery pack, etc.

According to an embodiment of the present disclosure, the energy storage device 100 may comprise an external charging interface coupled to the energy storage device 100 and configured to charge the energy storage device 100 from an external power source.

The drive system may comprise a plurality of modes including a second motor driven mode, a dual-motor driven mode, a serial mode, and a parallel mode.

The above modes are next described in detail in conjunction with FIGS. 2-5.

If the required power of the driving system is less than the maximum output power of the second motor 70 (for example, during heavy traffic in the city), the driving system may work in the second motor driven mode. In this mode, the energy storage device 100 provides power to the second motor 70; the second motor 70 provides power to the second wheels 90 group via the second reducing mechanism 80; and the vehicle is driven by the second wheels group 90.

If the required power of the driving system is greater than the maximum output power of the second motor 70 but less than the sum of the maximum output power of the first motor 30 and the second motor 70 (for example, when the load on the driving system is too heavy, when the vehicle is ascending an incline, or when the vehicle is overtaking other vehicles), the driving system may work in the dual-motor driven mode. In this mode, the energy storage device 100 provides power to the first motor 30 and the second motor 70; the first motor 30 drives the first wheels group 60 via the first reducing mechanism 50; and the second motor 70 drives the second wheel group via the second reducing mechanism 80.

If the energy storage device 100 is depleted of energy and the required power of the driving system is less than the maximum output power of the second motor 70, the driving system may work in the serial mode. In this mode, the power of the engine 10 is transmitted to the first motor 30 via the first clutch 20; the first motor 30 transforms the power into electric energy which is transported to the energy storage device 100; the energy storage device 100 provides power to the second motor 70; and the second motor 70 drives the second wheel group via the second reducing mechanism 80.

If the required power of the driving system is greater than the maximum output power of the first motor 30 and the second motor 70 for example, when the load on the driving system or vehicle is too heavy, when the vehicle is ascending an incline, or when the vehicle is overtaking other vehicles), the driving system may work in the parallel mode. In this mode, the engine 10 drives the first wheels group 60 via the first clutch 20, the first motor 30, the second clutch 40, and the first reducing mechanism 50; the energy storage device 100 provides power to the second motor 70; and the second motor 70 drives the second wheel group via the second reducing mechanism 80.

According to an embodiment of the present disclosure, a method of driving the hybrid power driving system is provided, which will be described in detail with reference to FIGS. 2-5. The driving method comprises: controlling clutch controller 110 by the motor controller 130 to engage or disengage the first clutch 20 and/or the second clutch 40 to switch between running modes of the hybrid power driving system.

According to an embodiment of the present disclosure, the motor controller 130 can switch the hybrid power driving system to the second motor driven mode, the dual-motor driven mode, the serial mode, and the parallel mode. The details for switching between the different modes are provided as follows.

Figure 2:
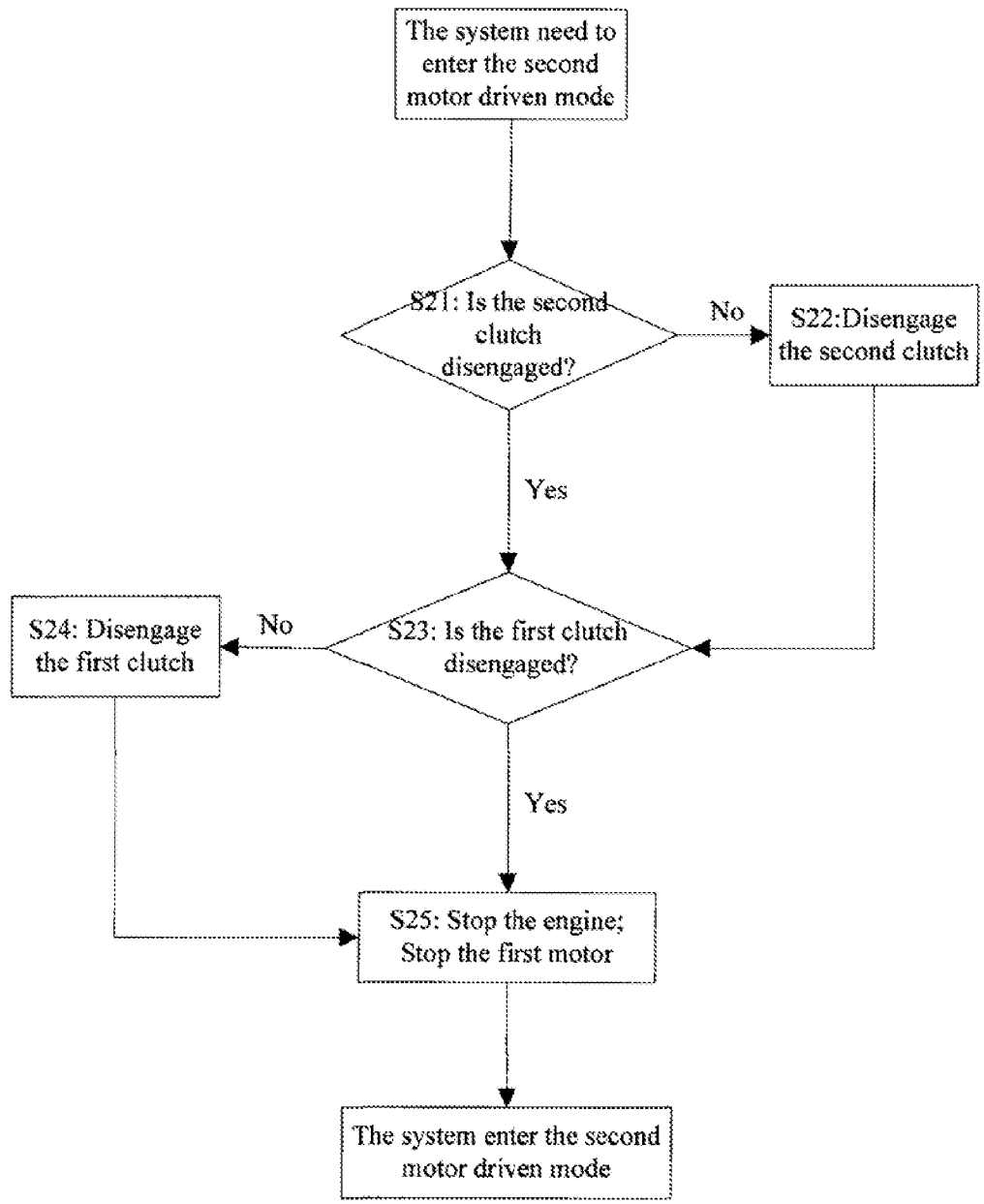
FIG. 2 is a flow chart showing a second motor driven mode of a hybrid power driving system according to an embodiment of the present disclosure.

As shown in FIG. 2, the hybrid power driving system is switched to the second motor driven mode by controlling the clutch controller 110 by the motor controller 130 to disengage the first clutch 20 and/or the second clutch 40 (S21 and S22); powering the second motor 70 with the energy storage device 100 (S23); and driving the second wheels group 90 by the second motor 70 via the second reducing mechanism 80 (S24).

Figure 3:
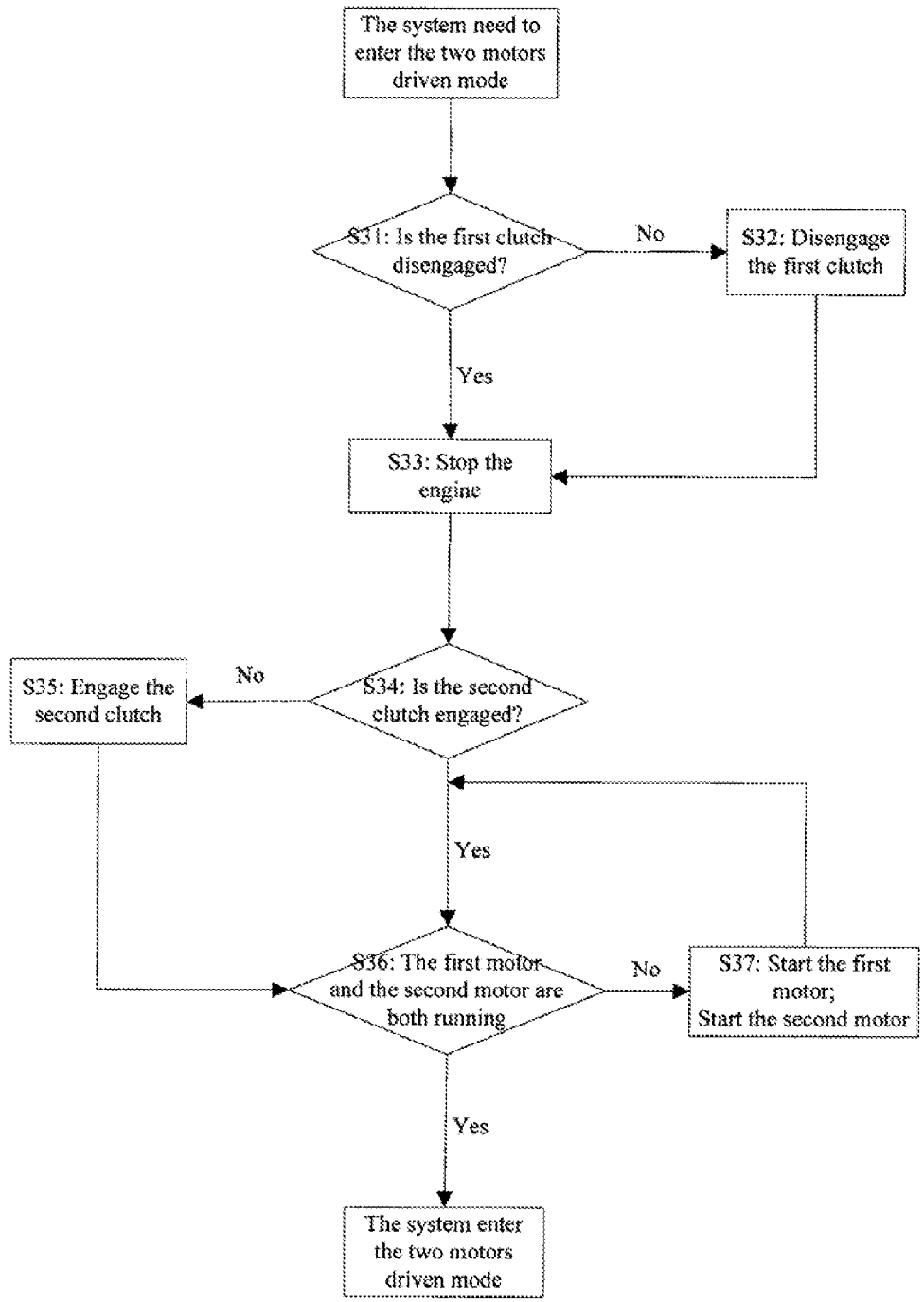
FIG. 3 is a flow chart showing a dual-motor driven mode of a hybrid power driving system according to an embodiment of the present disclosure.

The dual-motor driven mode is next described in detail with reference to FIG. 3. The hybrid power driving system is switched to the dual-motor driven mode by: controlling the clutch controller 110 by the motor controller 130 to disengage the first clutch 20 and/or engage the second clutch 40; powering the first motor 30 and the second motor 70 by the energy storage device 100; and driving the first wheels group 60 and the second wheels group 90 via the first reducing mechanism 50 and the second reducing mechanism 80, respectively. FIG. 3 is a flow chart showing a dual-motor driven mode of a hybrid power driving system according to an embodiment of the present disclosure. As shown in FIG. 3, it is first determined whether the first clutch 20 is disengaged (S31). If the first clutch 20 is disengaged (YES), the engine 10 is stopped (S33). If the first clutch 20 is not disengaged, the first clutch 20 is then disengaged (S32) and step S33 is executed.

Next, it is determined whether the second clutch 40 is engaged (S34). If the second clutch 40 is not engaged (NOT), the second clutch 40 is then engaged (S35). If the second clutch 40 is engaged, it is determined whether the first motor 30 and the second motor 70 are both running (S36). If it is determined that the first motor 30 and the second motor 70 are both running (YES), the driving system enters into the dual-motor driven mode. If it is determined that the first motor 30 and the second motor 70 are both not running, the first motor 30 and the second motor 70 are then started separately (S37).

Figure 4:
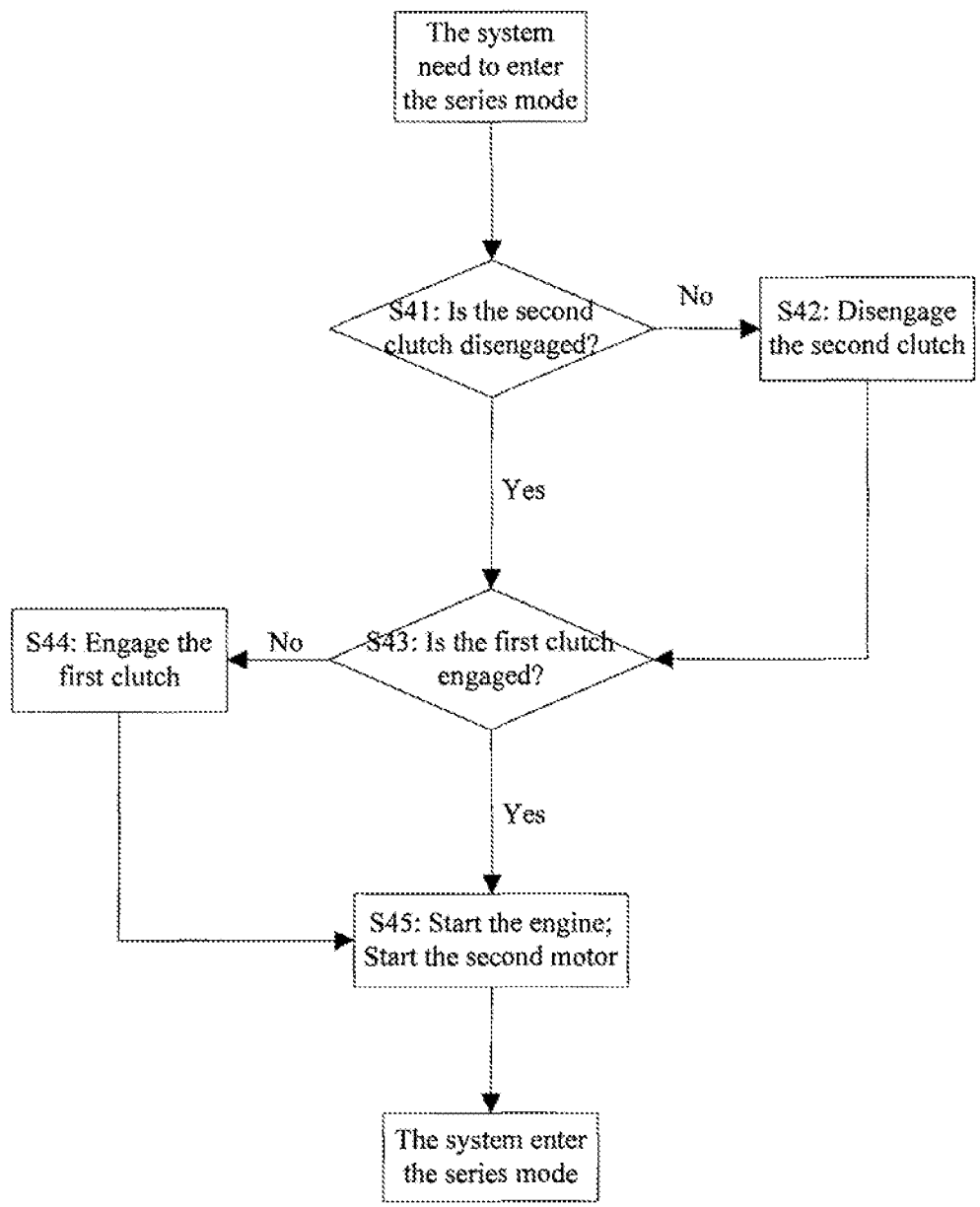
FIG. 4 is a flow chart showing a serial mode of a hybrid power driving system according to an embodiment of the present disclosure.

The serial mode is next described in detail with reference to FIG. 4. FIG. 4 is a flow chart showing a serial mode of a hybrid power driving system according to an embodiment of the present disclosure. According to an embodiment of the present invention, the hybrid power driving system is switched to the serial mode by: controlling the clutch controller 110 by the motor controller 130 to engage the first clutch 20 and/or disengage the second clutch 40; and controlling the engine controller 120 by the motor controller 130 to start the engine 10. As shown in FIG. 4, it is first determined whether the second clutch 40 is disengaged (S41). If the second clutch 40 is not disengaged (NOT), the second clutch 40 is then disengaged (S42). Next, it is determined whether the first clutch 20 is engaged (S43). If the first clutch 20 is not engaged (NOT), the first clutch 20 is then engaged (S44). If the first clutch 20 is engaged, the engine 10 and the second motor 70 are started so that the driving system runs in a serial mode.

Figure 5:
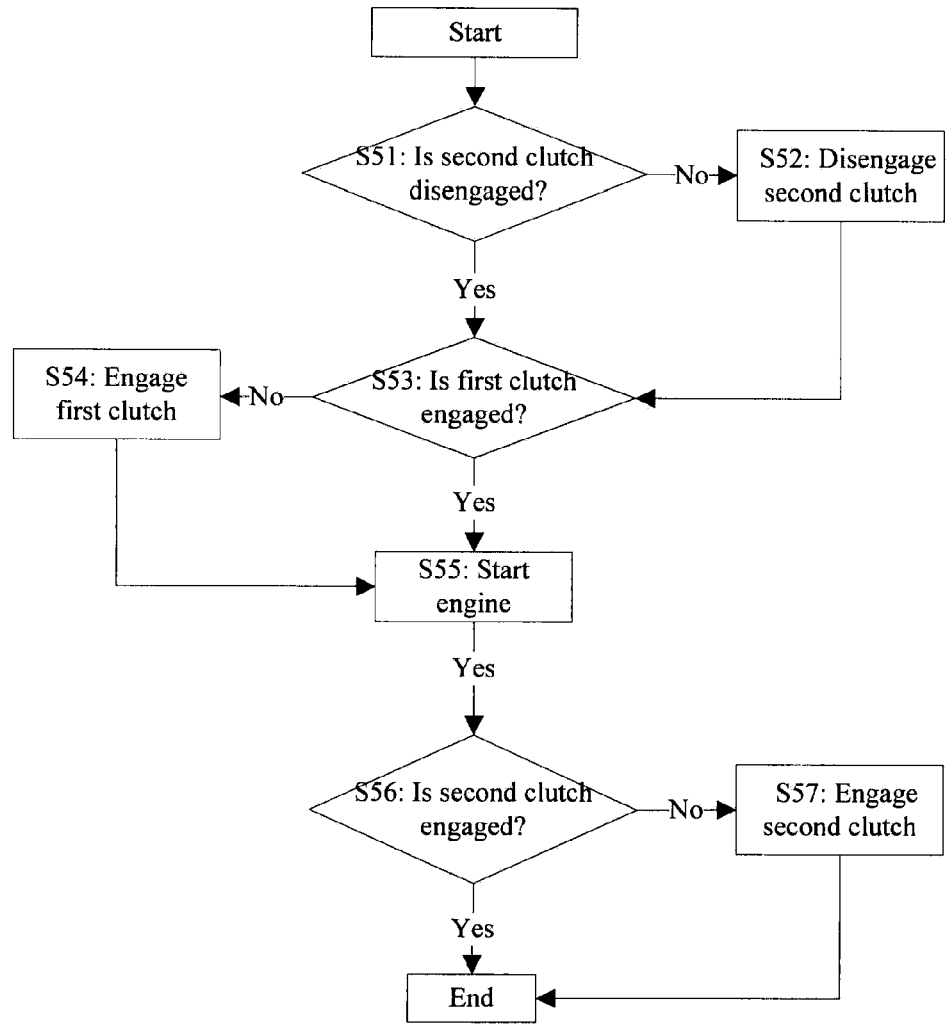
FIG. 5 is a flow chart showing a parallel mode of a hybrid power driving system according to an embodiment of the present disclosure.

The parallel mode is next described in detail with reference to FIG. 5. FIG. 5 is a flow chart showing the parallel mode of the hybrid power driving system according to an embodiment of the present disclosure. According to an embodiment of the present disclosure, the hybrid power driving system is switched to the parallel mode by: controlling the engine controller 120 by the motor controller 130 to start the engine 10; and controlling the clutch controller 110 by the motor controller 130 to engage the first clutch 20 and the second clutch 40 respectively. As shown in FIG. 5, firstly, it is determined whether the second clutch 40 is disengaged or not (S51). If NOT, the second clutch 40 is disengaged (S52) to avoid the damages to the engine 10. Then, it is determined whether the first clutch 20 is engaged or not (S53). If NOT, the first clutch 20 is engaged by the clutch controller 110 accordingly (S54). Then, the engine 10 is started by the engine controller 120 via the controlling of the motor controller 130 (S55). After the engine 10 is started, it is determined whether the second clutch 40 is engaged or not (S56). If NOT, the second clutch 40 is engaged accordingly (S57). After the first clutch 20 and the second clutches 40 are engaged, the driving system enters into the parallel mode.

Figure 6:
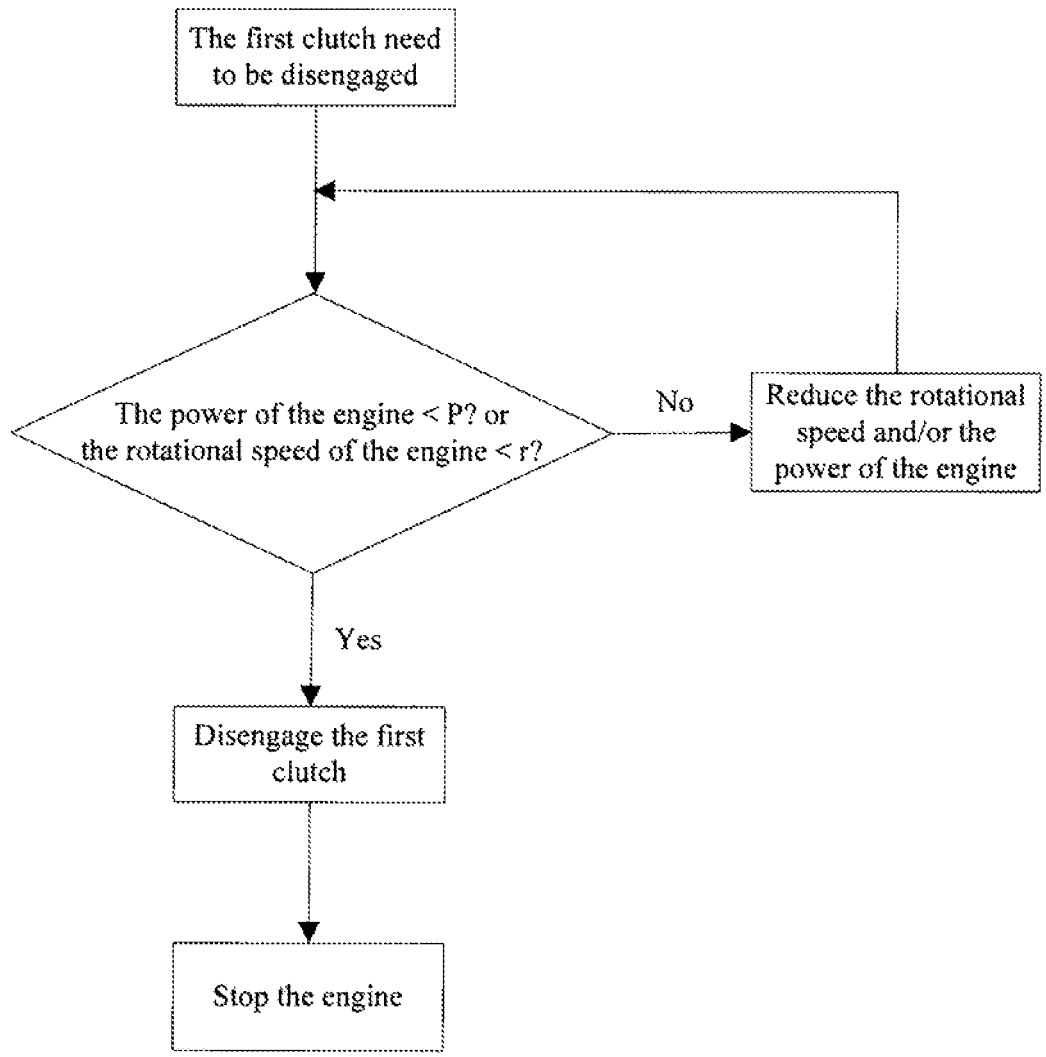
FIG. 6 is a flow chart showing when the first clutch is disengaged according to an embodiment of the present disclosure.

FIG. 6 is a flow chart showing when the first clutch is disengaged according to an embodiment of the present disclosure. As shown in FIG. 6, if the first clutch 20 needs to be disengaged, the motor controller 130 then detects the power of the engine 10 and the rotational speed of the engine 10. If the motor controller 130 detects that the power of the engine 10 is less than a preset value P or the rotational speed of the engine 10 is less than a preset value r, the motor controller 130 then controls the clutch controller 110 to disengage the first clutch 20. If the motor controller 130 detects that the power of the engine 10 is greater than or equal to a preset value P and the rotational speed of the engine 10 is greater than or equal to a preset value r, the motor controller 130 then controls the engine controller 120 to reduce the rotational speed and/or the power of the engine 10 until the power of the engine 10 is less than the preset value P or the rotational speed of the engine 10 is less than the preset value r, and controls the clutch controller 110 to disengage the first clutch 20.

Figure 7:
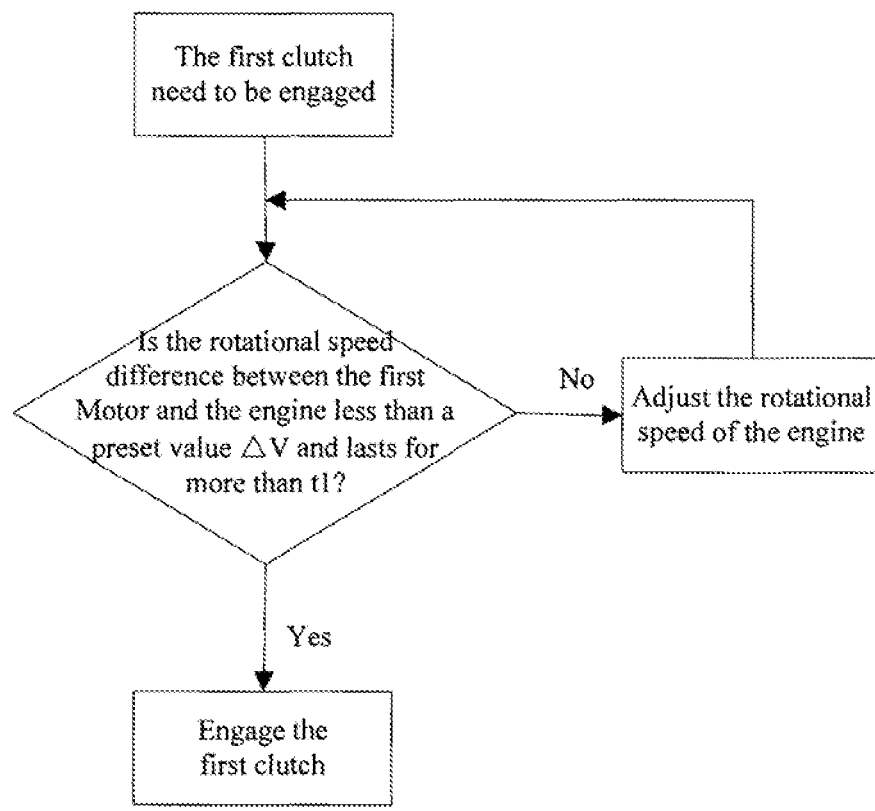
FIG. 7 is a flow chart showing when the first dutch is engaged according to an embodiment of the present disclosure.

FIG. 7 is a flow chart showing when the first dutch is engaged according to an embodiment of the present disclosure. As shown in FIG. 7, if the first clutch 20 needs to be engaged, the motor controller 130 detects the speed of the engine 10 and the speed of the motor. If the motor controller 130 detects that the rotational speed difference between the first motor 30 and the engine 10 is less than a preset value $\Delta V$ for at least a preset time period t1, the motor controller 130 then controls the clutch controller 110 to engage the first clutch 20. If the motor controller 130 detects that the rotational speed difference between the first motor 30 and the engine 10 is greater than or equal to a preset value $\Delta V$, or the rotational speed difference is less than the preset value $\Delta V$ for less than a preset time period t1, the motor controller 130 then controls the clutch controller 110 to adjust the rotational speed of the engine 10 until the rotational speed difference of the first motor 30 and the engine 10 is less than the preset value $\Delta V$ for more than the preset time period t1, and controls the clutch controller 110 to engage the first clutch 20.

Figure 8:
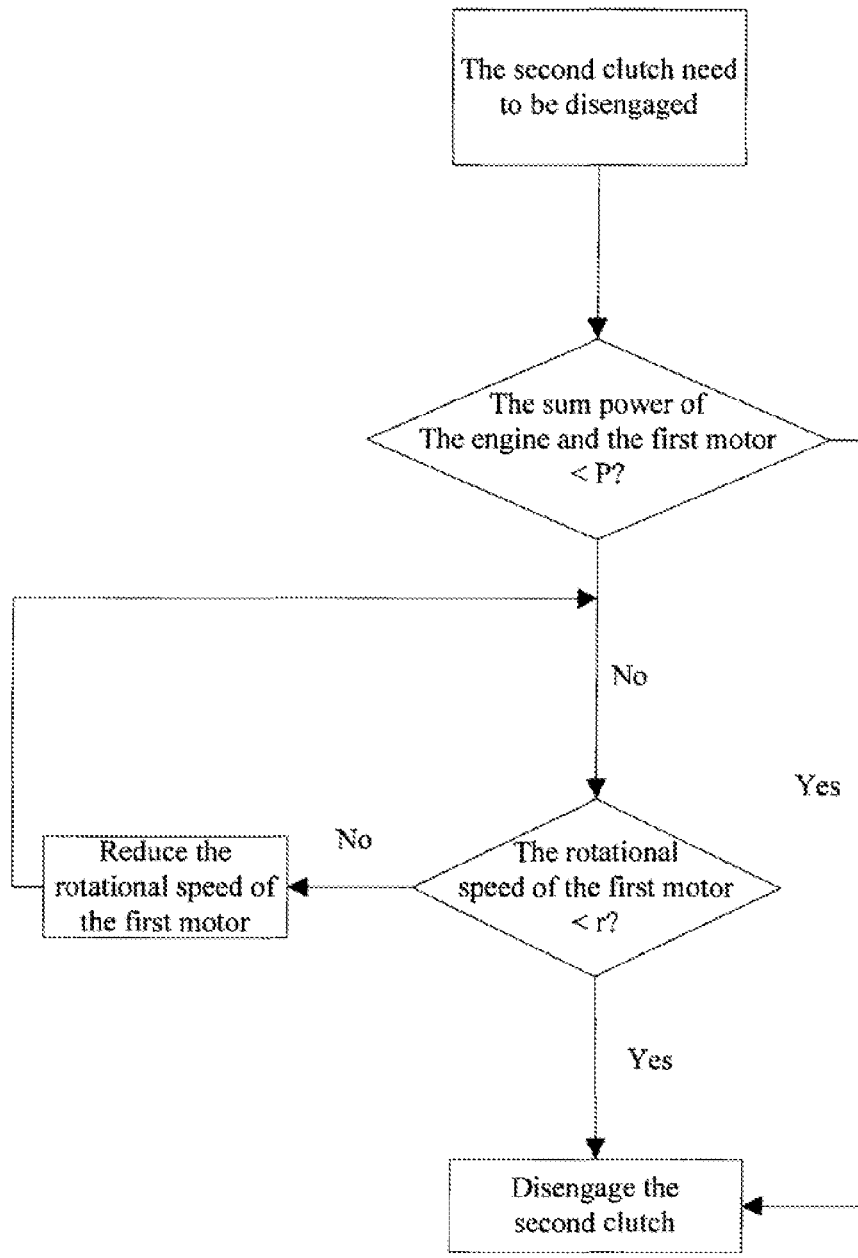
FIG. 8 is a flow chart showing when the second clutch is disengaged according to an embodiment of the present disclosure.

FIG. 8 is a flow chart showing when the second clutch is disengaged according to an embodiment of the present disclosure. As shown in FIG. 8, if the second clutch 40 needs to be disengaged, the motor controller 130 then detects the power of the engine 10 and the power of the first motor 30. If the motor controller 130 detects that the sum power of the engine 10 and the first motor 30 is less than a preset value P, the motor controller 130 then controls the clutch controller 110 to disengage the second clutch 40. If the motor controller 130 detects that the sum power of the engine 10 and the first motor 30 is greater than or equal to a preset value P and the rotational speed of the engine 10 is less than a preset value r, the motor controller 130 then controls the clutch controller 110 to disengage the second clutch 40. If the motor controller 130 detects that the sum power of the engine 10 and the first motor 30 is greater than or equal to a preset value P, and the rotational speed of the engine 10 is greater than or equal to a preset value r, the motor controller 130 then reduces the rotational speed of the first motor 30 until the rotational speed of the first motor 30 is less than r, and controls the clutch controller 110 to disengage the second clutch 40.

Figure 9:
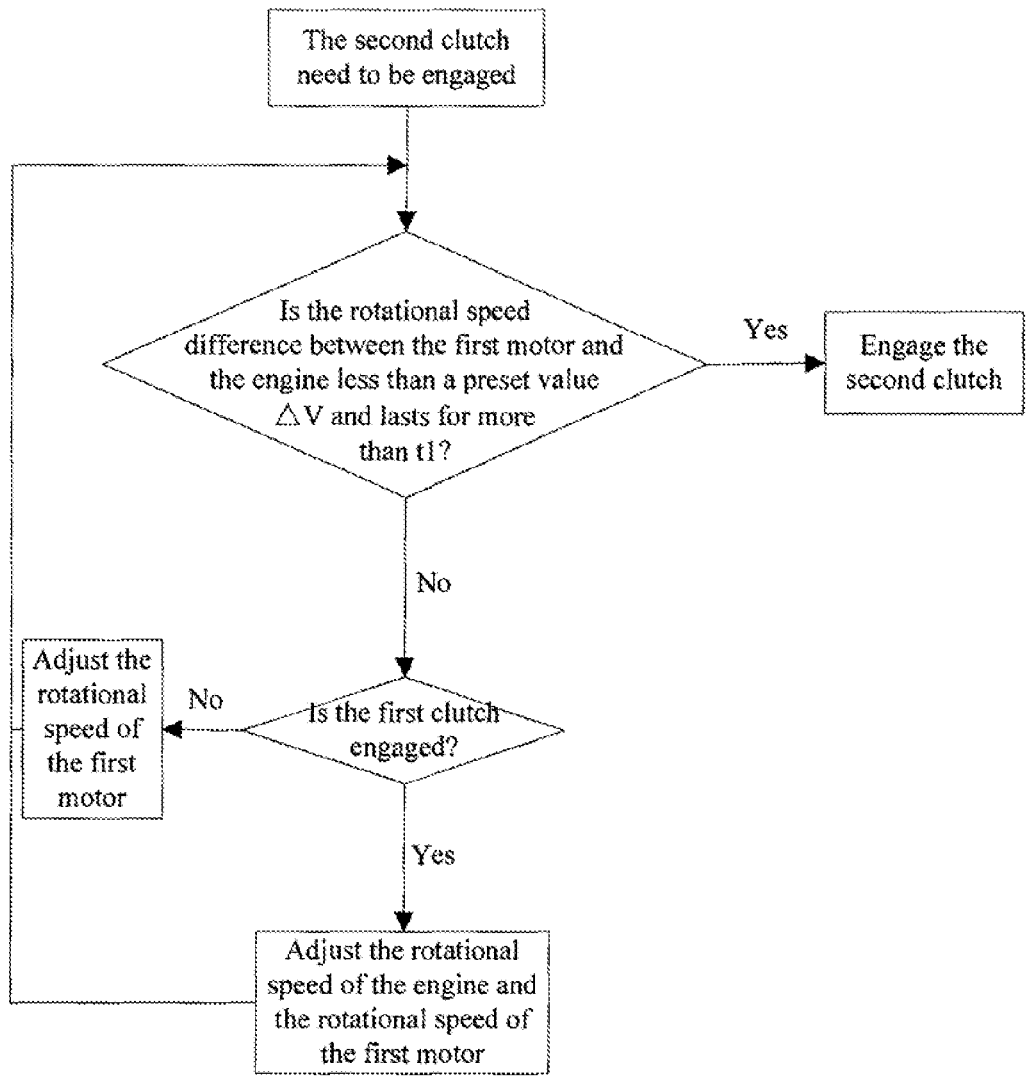
FIG. 9 is a flow chart showing when the second clutch is engaged according to an embodiment of the present disclosure.

FIG. 9 is a flow chart showing when the second clutch is engaged according to an embodiment of the present disclosure. As shown in FIG. 9, if the second clutch 40 needs to be engaged, the motor controller 130 then detects the speed of the engine 10 and the speed of the motor. If the motor controller 130 detects that the rotational speed difference between the first motor 30 and the engine 10 is less than a preset value ΔV and for more than a preset time period t1, the motor controller 130 then controls the clutch controller 110 to engage the second clutch 40. If the motor controller 130 detects that the rotational speed difference between the first motor 30 and the engine 10 is greater than or equal to the preset value ΔV, or the rotational speed difference is less than the preset value ΔV for less than a preset time period t1, and that the first clutch 20 is engaged, the motor controller 130 then adjusts the rotational speed of the engine 10 and the rotational speed of the first motor 30 until the rotational speed difference between the first motor 30 and the present vehicle speed is less than the preset value ΔV for more than the preset time period t1, and controls the clutch controller 110 to engage the second clutch 40. If the motor controller 130 detects that the rotational speed difference between the first motor 30 and the engine 10 is greater than or equal to the preset value ΔV, or the rotational speed difference is less than the preset value ΔV for less than a preset time period t1, and that the first clutch 20 is disengaged, the motor controller 130 then adjusts the rotational speed of the first motor 30 until the rotational speed difference between the first motor 30 and the present vehicle speed is less than the preset value ΔV for more than the preset time period t1, and controls the clutch controller 110 to engage the second clutch 40.

In the above disclosed method, the preset value P ranges from about 4 KW to about 6 KW, preferably 5 KW. The preset value r ranges from about 800 r/min to about 1200 r/min, preferably 1000 r/min. The preset value ΔV ranges from about 100 r/min to about 250 r/min, preferably 160 r/min. The preset time period t1 ranges from about 0.4 s to about 0.6 s, preferably 0.5 s.

In the driving system and method as described above, the clutches are accurately controlled with greater efficiency with the aid of the motor controller and the clutch controller, thus improving the stability for power transmission in the vehicle.

Although the preferred embodiments of the present disclosure have been described above, the present disclosure is not limited to the above, and those who are skilled in this field shall understand that many amendments, replacements or variations may be made according to the present disclosure, which are all within the scope of protection of the present disclosure.

What is claimed is:

1. A hybrid power driving system comprising:
an engine;
a first motor;
a first clutch operatively coupled between the engine and the first motor;
a first reducing mechanism having a first input portion and a first output portion;
a second clutch operatively coupled between the first motor and the first input portion of the first reducing mechanism;
a first wheels group operatively coupled to the first output portion of the first reducing mechanism;
a second motor;
a second wheels group;
a second reducing mechanism having a second input portion operatively coupled to the second motor, and a second output portion operatively coupled to the second wheels group;
an energy storage device coupled to the first motor and the second motor;
a clutch controller configured to engage or disengage at least one of the first clutch or the second clutch;
an engine controller configured to start or stop the engine; and
a motor controller coupled with the clutch controller and the engine controller, configured to:
start or stop at least one of the first motor or the second motor, and
control the clutch controller and the engine controller according to a running mode of the hybrid power driving system;
wherein the motor controller is further configured to:
control the clutch controller to disengage the second clutch if a sum power of the engine and the first motor is less than a preset value P, and
control the clutch controller to engage the second clutch if a rotational speed difference between the first motor and the engine remains less than a preset value ΔV for at least a preset time period t1.

2. The hybrid power driving system of claim 1, further comprising an external charging interface coupled to the energy storage device and configured to charge the energy storage device from an external power source.

3. The hybrid power driving system of claim 1, wherein the running mode of the hybrid power driving system comprises a second motor driven mode in which:
the first clutch and the second clutch are disengaged;
the second motor is powered by the energy storage device; and
the second wheels group is driven by the second motor via the second reducing mechanism.

4. The hybrid power driving system of claim 3, wherein the running mode of the hybrid power driving system further comprises a dual-motor driven mode in which:
the first clutch is disengaged and the second clutch is engaged;
the first motor and the second motor are powered by the energy storage device;
the first wheels group is driven by the first motor via the first reducing mechanism; and
the second wheels group is driven by the second motor via the second reducing mechanism.

5. The hybrid power driving system of claim 3, wherein the running mode of the hybrid power driving system further comprises a serial mode in which:
the first clutch is engaged and the second clutch is disengaged;
the power of the engine is transmitted to the first motor via the first clutch;
the first motor transforms the power into electric energy which is stored in the energy storage device;
the second motor is powered by the energy storage device; and
the second wheels group is driven by the second motor via the second reducing mechanism.

6. The hybrid power driving system of claim 3, wherein the running mode of the hybrid power driving system further comprises a parallel mode in which:
the first clutch and the second clutch are engaged;
the first wheels group is driven by the engine via the first clutch, the first motor, the second clutch, and the first reducing mechanism;
the second motor is powered by the energy storage device; and
the second wheels group is driven by the second motor via the second reducing mechanism.

7. A method for driving a hybrid power driving system, comprising:
controlling a clutch controller by a motor controller to engage or disengage at least one of a first clutch or a second clutch to switch between running modes of the hybrid power driving system;
wherein when the second clutch is disengaged, the motor controller detects whether a sum power of an engine and a first motor is less than a preset value P, and
if the motor controller detects that the sum power of the engine and the first motor is less than the preset value P, the clutch controller disengages the second clutch; or
if the motor controller detects that the sum power of the engine and the first motor is greater than or equal to the preset value P, and the first motor has a rotational speed less than a second preset value r, the clutch controller disengages the second clutch; or
if the motor controller detects that the sum power of the engine and the first motor is less than the preset value P, and the first motor has a rotational speed greater than or equal to the second preset value r, the motor controller reduces the rotational speed of the first motor until the rotational speed of the first motor is less than the second preset value r, and controls the clutch controller to disengage the second clutch.

8. The driving method of claim 7, further comprising switching, by the motor controller, the hybrid power driving system to a second motor driven mode, dual-motor driven mode, serial mode, or parallel mode.

9. The driving method of claim 8, wherein switching the hybrid power driving system to the second motor driven mode by:
controlling the clutch controller by the motor controller to disengage at least one of the first clutch or the second clutch;
powering a second motor with an energy storage device; and
driving a second wheels group by the second motor via a second reducing mechanism.

10. The driving method of claim 8, wherein switching the hybrid power driving system to the dual-motor driven mode by:
controlling the clutch controller by the motor controller to disengage at least one of the first clutch or engage the second clutch;
powering the first motor and a second motor by an energy storage device; and
driving a first wheels group and a second wheels group via a first reducing mechanism and a second reducing mechanism, respectively.

11. The driving method of claim 8, wherein switching the hybrid power driving system to the serial mode by:
controlling the clutch controller by the motor controller to engage at least one of the first clutch or disengage the second clutch; and
controlling an engine controller by the motor controller to start the engine.

12. The driving method of claim 8, wherein switching the hybrid power driving system to the parallel mode by:
controlling an engine controller by the motor controller to start the engine; and
controlling the clutch controller by the motor controller to engage at least one of the first clutch or the second clutch.

13. The driving method of claim 7, wherein when the first clutch is disengaged, the motor controller detects whether power of the engine is less than a preset value P or if rotational speed of the engine is less than a preset value r, and
if the motor controller detects that the power of the engine is less than the preset value P or if the rotational speed of the engine is less than the preset value r: the clutch controller disengages the first clutch; or
if the motor controller detects that the power of the engine is greater than or equal to the preset value P or if the rotational speed of the engine is greater than or equal to the preset value r: the engine controller controlled by the motor controller reduces at least one of the rotational speed or the power of the engine until the power of the engine is less than the preset value P or the rotational speed of the engine is less than the preset value r, and the clutch controller disengages the first clutch.

14. The driving method of claim 7, wherein when the first clutch is engaged, the motor controller detects whether a rotational speed difference between a first motor and the engine remains less than a first preset value $\Delta V$ for at least a first preset time period t1, and
if the motor controller detects that the rotational speed difference between the first motor and the engine remains less than the first preset value $\Delta V$ for at least the first preset time period t1: the clutch controller engages the first clutch; or
if the motor controller detects that the rotational speed difference between the first motor and the engine is greater than or equal to the first preset value $\Delta V$ or remains less than the first preset value $\Delta V$ for less than the first preset time period t1: the clutch controller adjusts the rotational speed of the engine until the rotational speed difference of the first motor and the engine is less than the first preset value $\Delta V$ and remains less than the first preset value $\Delta V$ for at least the first preset time period t1 to engage the first clutch.

15. The driving method of claim 7, wherein when the second clutch is engaged, the motor controller detects whether a rotational speed difference between a first motor and the engine remains less than a preset value $\Delta V$ for at least a preset time period t1, and
if the motor controller detects that the rotational speed difference between the first motor and the engine remains less than the preset value $\Delta V$ for at least the preset time period t1: the clutch controller engages the second clutch; or
if the motor controller detects that the rotational speed difference between the first motor and the engine remains less than the preset value $\Delta V$ for less than the preset time period t1, or if the rotational speed difference between the first motor and the engine is greater than or equal to the preset value $\Delta V$, then:
if the first clutch is engaged: the motor controller adjusts the rotational speed of the engine and the rotational speed of the first motor until the rotational speed difference between the first motor and the present vehicle speed is less than the preset value $\Delta V$ and remains less than the preset value $\Delta V$ for more than the preset time period t1, and controls the clutch controller to engage the second clutch, and
if the first clutch is disengaged: the motor controller adjusts the rotational speed of the first motor until the rotational speed difference between the first motor and the present vehicle speed is less than the preset value $\Delta V$ and remains less than the preset value $\Delta V$ for more than the preset time t1, and controls the clutch controller to engage the second clutch.

16. The driving method of claim 13, wherein the preset value P is substantially 4 KW to substantially 6 KW.

17. The driving method of claim 13, wherein the preset value r is substantially 800 r/min to substantially 1200 r/min.

18. The driving method of claim 14, or 15, wherein the preset value ΔV is substantially 100 r/min to substantially 250 r/min.

19. The driving method of claim 14 or 15, wherein the preset time period t1 is substantially 0.4 s to substantially 0.6 s.

20. A method for driving a hybrid power driving system, comprising:
   controlling a clutch controller by a motor controller to engage or disengage at least one of a first clutch or a second clutch to switch between running modes of the hybrid power driving system;
   wherein when the second clutch is engaged, the motor controller detects whether a rotational speed difference between a first motor and an engine remains less than a preset value ΔV for at least a preset time period t1, and
   if the motor controller detects that the rotational speed difference between the first motor and the engine is less than the preset value ΔV for at least the preset time period t1: the clutch controller engages the second clutch; or
   if the motor controller detects that the rotational speed difference between the first motor and the engine remains less than the preset value ΔV for less than the preset time period t1, or if the rotational speed difference between the first motor and the engine is greater than or equal to the preset value ΔV, then:
      if the first clutch is engaged: the motor controller adjusts the rotational speed of the engine and the rotational speed of the first motor until the rotational speed difference between the first motor and the preset vehicle speed is less than the preset value ΔV and remains less than the preset value ΔV for more than the preset time period t1, and controls the clutch controller to engage the second clutch, and
      if the first clutch is disengaged: the motor controller adjusts the rotational speed of the first motor until the rotational speed difference between the first motor and the present vehicle speed is less than the preset value ΔV and remains less than the preset value ΔV for more than the preset time t1, and controls the clutch controller to engage the second clutch.

* * * * *